Feb. 11, 1969  SHIGEAKI NAGATA  3,426,666
SINGLE-LENS REFLEX CAMERA USING CARTRIDGE FILM
Filed March 14, 1966

Shigeaki Nagata,
INVENTOR

BY Wenderoth,
Lind and Ponack,
Attorneys

United States Patent Office 3,426,666
Patented Feb. 11, 1969

3,426,666
SINGLE-LENS REFLEX CAMERA USING CARTRIDGE FILM
Shigeaki Nagata, Tokyo-to, Japan, assignor to Mamiya Koki Kabushiki Kaisha, Tokyo-to, Japan, a joint-stock company of Japan
Filed Mar. 14, 1966, Ser. No. 534,064
U.S. Cl. 95—42
Int. Cl. G03b 19/12, 19/02
1 Claim

ABSTRACT OF THE DISCLOSURE

A single-lens reflex camera which has a continuous peripheral lip projecting rearwardly and parallel to the optical axis from the rear end of the mirror box and abutting tightly against the focus determining surface of a film cartridge loaded in the camera. This establishes the focusing position of the film cartridge and provides a seal against light leakage. Each of the recesses for accommodating the film roll casing parts of the film cartridge has a partially cylindrical wall which terminates at its inner end close to the side part of the mirror box with the inner end being cut off parallel to the lip of the mirror box at a position spaced forwardly from said lip part. There is thus no peripheral part surrounding the lip part and the adjacent film roll case can be positioned extremely close to the lip.

---

This invention relates to single-lens reflex cameras and to cartridge film such as that used in the Kodak Instamatic cameras. More particularly, the invention concerns an improvement of a single-lens reflex camera in which cartridge film is used.

The highly advantageous features of cartridge films are well known, but since they do not directly concern the improvement of the present invention, will not be described herein. The light sealing character of a film cartridge for cartridge film of the type referred to above, however, is advantageously utilized in the present invention.

An object of the invention is to provide the construction and arrangement stated above which is simple and compact, whereby the camera, itself, can be miniaturized and produced at low cost.

Another object of the invention is to afford easy and positive setting of the film surface in the focus plane.

A further object of the invention is to provide a single-lens reflex camera wherein the distance between the inner sides of the film roll casing parts of a film cartridge is fully utilized to afford maximum width of the mirror box of the camera.

The objects of the present invention are achieved by providing a single-lens reflex camera which has a continuous peripheral lip projecting rearwardly and parallel to the optical axis from the rear end of the mirror box and abutting tightly against the focus determining surface of a film cartridge loaded in the camera. This establishes the focusing position of the film cartridge and provides a seal against light leakage. Each of the recesses for accommodating the film roll casing parts of the film cartridge has a partially cylindrical wall which terminates at its inner end close to the side part of the mirror box with the inner end being cut off parallel to the lip of the mirror box at a position spaced forwardly from said lip part. There is thus no peripheral part surrounding the lip part and the adjacent film roll case can be positioned extremely close to the lip.

The nature, principle, and details of the invention will be more clearly apparent from the following detailed description with respect to a preferred embodiment of the invention when taken in conjunction with the accompanying drawings in which like parts are designated by like reference numerals, and in which.

Figure 1:
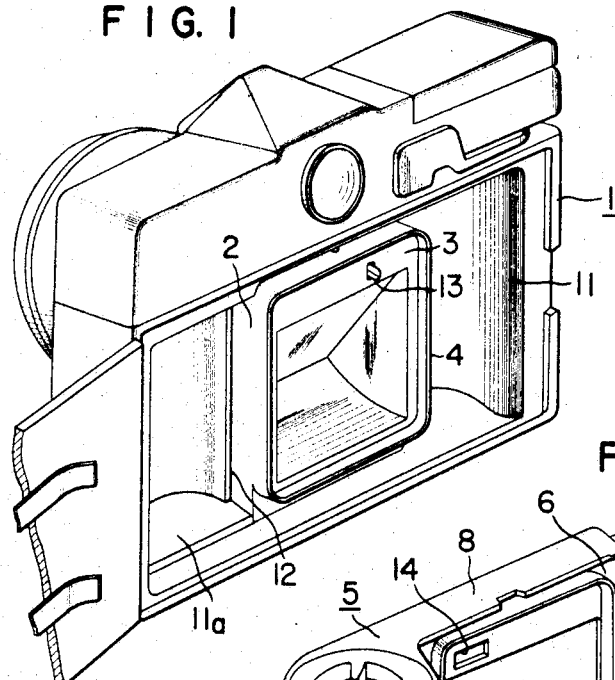
FIGURE 1 is a perspective view showing a camera embodying the invention with its rear cover opened.
Figure 2:
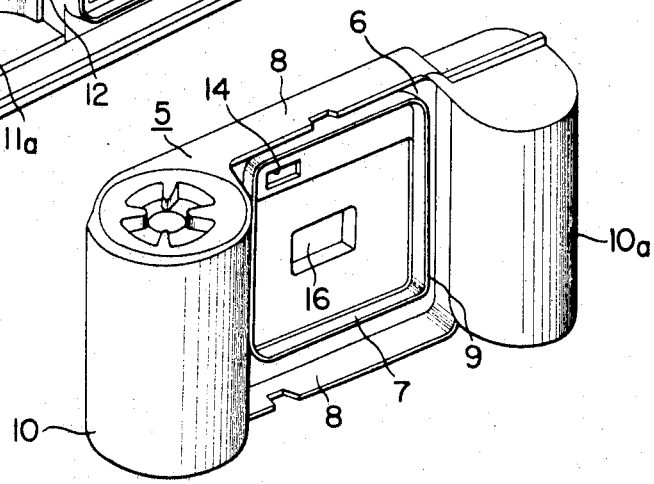
FIGURE 2 is a perspective view of a film cartridge suitable for using in the camera of the invention.
Figure 3:
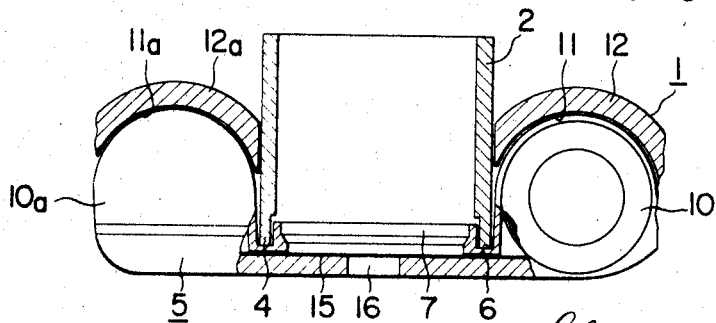
FIGURE 3 is a fragmentary plan view, in section with parts cut away, showing the essential parts of the camera according to the invention with a film cartridge fitted therein in loaded state.

Referring to FIGS. 1 and 3, the camera body 1 contains a mirror box 2 fixedly inserted therein and having at its rear peripheral part a continuous peripheral lip 4 projecting rearwardly and parallelly to the optical axis from the mask plane 3. The length of this lip 4 in the rearward direction is made somewhat greater than the depth of a recessed groove 9 formed by and between a projecting lip 7 provided on the focus determining surface 6 and an outer peripheral part 8 of a film cartridge 5 as shown in FIG. 2.

The camera body 1 is further provided with recesses 11 and 11$_a$ on the right and left sides of the mirror box 2 to accommodate film roll cases 10 and 10$_a$ of the cartridge 5. The wall parts 12 and 12$_a$ on the camera body side which define the recesses 11 and 11$_a$ are formed at their inner ends close to the mirror box 2.

An improved feature of the construction of the wall parts 12 and 12$_a$ is that their inner ends close to the mirror box 2 are cut off parallelly and not extended circumferentially around to the lip 4 of the mirror box 2, as clearly shown in FIG. 3, whereby an economy in space dimension in the lateral direction of the camera body amounting to approximately twice the thickness of the wall 12 is realized. The remaining parts of the walls of the recesses 11 and 11$_a$ rearward from the inner ends of the walls 12 and 12$_a$ are formed by the outer side surfaces of the mirror box 2 including the lip 4.

The camera is further provided with a film winding stop 13 adapted to protrude and retract through an opening in the mask plane 3 to engage with and disengage from a sprocket perforation in the film 15 in a film cartridge 5 in loaded state in the camera body 1. The cartridge 5 is further provided with a window 14 for permitting the film winding stop 13 to engage with a perforation of the film 15 and a window 16 for observing the film frame number.

The dimensions and shape of the aforedescribed lip 4 are so selected that, when the cover plate of the camera body 1 is opened and a film cartridge 5 is loaded, the entire lip 4 of the mirror box 2 fits into the recessed groove 9 of the cartridge 5, and the rim end surface of the entire lip 4 abuts against the focus determining surface 6 of the cartridge 5. The cover plate in closed state holds the cartridge 5 in stable loaded state.

Thus, the rim end surface of the lip 4, that is, the end surface of the mirror box 2 of the single-lens reflex camera according to the invention, functions directly as a focus determining surface. Moreover, through the utilization according to the invention of the tightness against light leakage possessed by the cartridge and of the focus determining surface 6 and the groove 9 thereof, the necessity of sealing the contact fit between the mirror box and the camera body against leakage of light is eliminated, and mechanisms such as the mirror driving mechanism and lens diaphragm actuating mechanism can be readily installed on the sides of the mirror box in the ordinary manner. Accordingly, the present invention makes possible the use of film cartridges of the instant type in an easy and simple manner in single-lens reflex cameras.

Further advantageous features of the camera according to the invention are a simple and compact construction of the camera itself, low production cost, the use of the maximum width of the mirror box between the film roll cases of the film cartridge, and easy and positive setting of the film surface in the focus plane.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claim.

What I claim is:

1. In a single-lens reflex camera adapted to use cartridge film having film roll casings on each end and a focus determining surface, said camera having a camera body and a mirror box, the camera body being provided with a pair of right and left recesses adapted to accommodate the film roll casing parts of a film cartridge and a mirror box in the camera body between said recesses and extending rearwardly, the improvement comprising a continuous peripheral lip projecting rearwardly and parallel to the optical axis from the extreme rear end of said mirror box, said lip having a shape adapted to abut tightly against the focus determining surface of a film cartridge when the cartridge is loaded in the camera thereby to establish the focus positioning of the film cartridge and to attain a seal against light leakage, and each of said recesses having a partially cylindrical wall terminating at its inner end close to the central side part of said mirror box, said inner end being cut off parallel to said lip of the mirror box at a position spaced forwardly from said lip part so that no peripheral part surrounds said lip part and the adjacent film roll case can be positioned extremely close to said lip.

References Cited

UNITED STATES PATENTS 2,890,638  6/1959  Rentschler _____ 95—42 XR

FOREIGN PATENTS 1,359,143  3/1964  France.

NORTON ANSHER, *Primary Examiner.*

FRED L. BRAUN, *Assistant Examiner.*

U.S. Cl. X.R.

95—31